(12) United States Patent
Dietze

(10) Patent No.: US 8,814,036 B2
(45) Date of Patent: Aug. 26, 2014

(54) CHIP CARD WITH AT LEAST ONE APPLICATION

(75) Inventor: Claus Dietze, Obersoechering (DE)

(73) Assignee: Giesecke & Devrient GmbH, Munich (DE)

( * ) Notice: Subject to any disclaimer, the term of this patent is extended or adjusted under 35 U.S.C. 154(b) by 2509 days.

(21) Appl. No.: 10/558,476

(22) PCT Filed: Jun. 1, 2004

(86) PCT No.: PCT/EP2004/005902
§ 371 (c)(1),
(2), (4) Date: Jan. 10, 2007

(87) PCT Pub. No.: WO2004/107249
PCT Pub. Date: Dec. 9, 2004

(65) Prior Publication Data
US 2007/0095923 A1    May 3, 2007

(30) Foreign Application Priority Data
Jun. 3, 2003   (DE) .................................. 103 24 996

(51) Int. Cl.
H04M 1/66     (2006.01)
H04M 1/68     (2006.01)
H04M 3/16     (2006.01)
G06F 17/00    (2006.01)
G06K 5/00     (2006.01)
G06K 7/08     (2006.01)
G06K 19/00    (2006.01)

(52) U.S. Cl.
USPC ........... 235/375; 235/382; 235/449; 235/451; 235/487; 455/411

(58) Field of Classification Search
USPC .......... 455/410, 411, 558; 235/382, 449, 451, 235/487, 492, 493, 375
See application file for complete search history.

(56) References Cited

U.S. PATENT DOCUMENTS

| 4,943,868 | A | * | 7/1990 | Yoshinaga et al. | 358/403 |
| 5,293,577 | A | * | 3/1994 | Hueske et al. | 705/65 |
| 5,438,184 | A | * | 8/1995 | Roberts et al. | 235/380 |
| 5,563,400 | A | * | 10/1996 | Le Roux | 235/486 |
| 5,954,808 | A | * | 9/1999 | Paul | 710/104 |
| 5,991,875 | A | * | 11/1999 | Paul | 713/2 |

(Continued)

FOREIGN PATENT DOCUMENTS

| CA | 2 275 931 A1 | 7/1998 |
| DE | 195 22 527 A1 | 6/1995 |

(Continued)

OTHER PUBLICATIONS

"Inside Windows NT Workstation"; Eckel, George; New Riders Publishing, 1996; pp. 249-254.

(Continued)

*Primary Examiner* — Daniel Walsh
(74) *Attorney, Agent, or Firm* — Workman Nydegger

(57) ABSTRACT

The invention relates to a chip card with at least one application for which an implementation (4) and an entry (5) referring to the implementation (4) are present on the chip card (1). The inventive chip card is characterized in that a plurality of entries (5) referring to the same implementation (4) are present.

11 Claims, 1 Drawing Sheet

(56) References Cited

U.S. PATENT DOCUMENTS

| | | | |
|---|---|---|---|
| 6,189,081 B1* | 2/2001 | Fujio | 711/171 |
| 6,279,047 B1 | 8/2001 | Bublitz et al. | 710/11 |
| 6,363,436 B1* | 3/2002 | Hagy et al. | 719/331 |
| 6,776,346 B1* | 8/2004 | Sonzogni et al. | 235/492 |
| 6,824,064 B2* | 11/2004 | Guthery et al. | 235/492 |
| 6,848,038 B1 | 1/2005 | Bohler | 711/163 |
| 6,961,587 B1* | 11/2005 | Vilppula et al. | 455/558 |
| 7,191,288 B2* | 3/2007 | de Jong | 711/115 |
| 7,222,164 B1* | 5/2007 | Deh et al. | 709/219 |
| 7,715,833 B2* | 5/2010 | Sanchez | 455/419 |
| 7,815,125 B2* | 10/2010 | Stranges et al. | 235/492 |
| 8,374,647 B2* | 2/2013 | Ando et al. | 455/558 |
| 8,628,008 B1* | 1/2014 | Lee et al. | 235/380 |
| 2001/0038759 A1* | 11/2001 | Kawabe | 399/79 |
| 2002/0019698 A1* | 2/2002 | Vilppula et al. | 701/207 |
| 2002/0066792 A1* | 6/2002 | Guthery et al. | 235/492 |
| 2002/0083322 A1* | 6/2002 | Lagosanto et al. | 713/172 |
| 2002/0099871 A1* | 7/2002 | Vargas et al. | 709/328 |
| 2002/0139861 A1* | 10/2002 | Matsumoto et al. | 235/492 |
| 2004/0015966 A1* | 1/2004 | MacChiano et al. | 718/1 |
| 2004/0192309 A1* | 9/2004 | Watanabe et al. | 455/439 |
| 2004/0235464 A1* | 11/2004 | Korkalo et al. | 455/418 |
| 2005/0101309 A1* | 5/2005 | Croome | 455/418 |
| 2005/0178833 A1* | 8/2005 | Kisliakov | 235/441 |
| 2005/0188360 A1* | 8/2005 | de Jong | 717/136 |
| 2006/0052135 A1* | 3/2006 | Miyauchi | 455/556.1 |
| 2007/0095923 A1* | 5/2007 | Dietze | 235/492 |
| 2007/0099661 A1* | 5/2007 | Schmitt | 455/558 |
| 2008/0128515 A1* | 6/2008 | Di Iorio | 235/492 |
| 2008/0261656 A1* | 10/2008 | Bella et al. | 455/558 |
| 2009/0055597 A1* | 2/2009 | Robles | 711/147 |
| 2009/0203354 A1* | 8/2009 | Tanabe | 455/411 |
| 2010/0273521 A1* | 10/2010 | Vong et al. | 455/550.1 |

FOREIGN PATENT DOCUMENTS

| | | |
|---|---|---|
| DE | 197 18 115 A1 | 4/1997 |
| DE | 199 37 529 A1 | 8/1999 |
| EP | 1061440 | 12/2000 |
| JP | 10-111793 | 4/1998 |
| JP | 2002544610 A | 12/2002 |
| JP | 2003030609 | 1/2003 |
| WO | WO 00/69183 | 11/2000 |
| WO | WO 01/67240 | 9/2001 |

OTHER PUBLICATIONS

"Digital Cellular Telecommunications System (Phase 2); Support of Localised Service Area (SoLSA); Stage 2 (3GPP TS 43.073 version 5.0.0 Release 5); ETSI TS 143 073"; European Telecommunications Standards Institute; Jun. 2002; pp. 1-26.

* cited by examiner

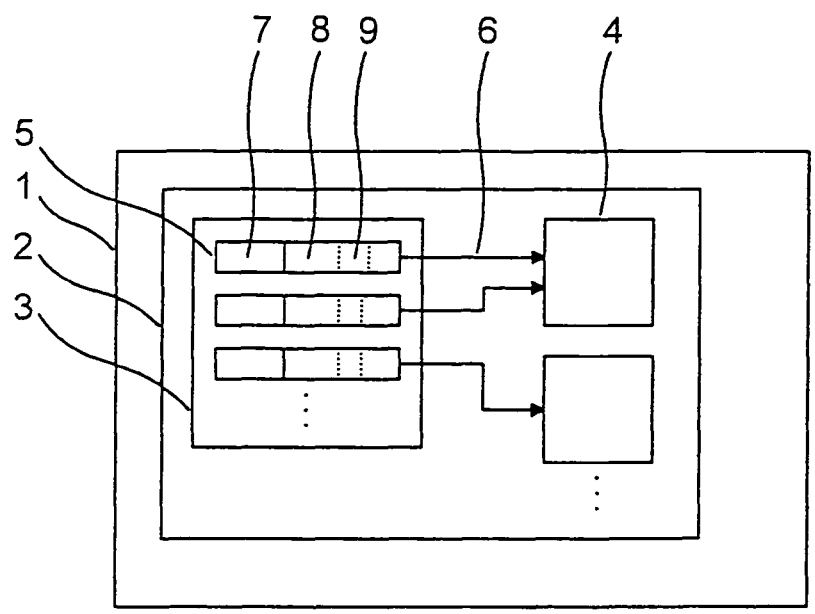

CHIP CARD WITH AT LEAST ONE APPLICATION

FIELD OF THE INVENTION

This invention relates to a chip card with at least one application. The invention further relates to a method for executing an application available on a chip card.

BACKGROUND

Chip cards can be used very diversely, for example for making payment transactions, as identification documents for access controls, as proof of authorization for using a mobile phone system, etc. For this purpose, the chip cards have implemented thereon applications in the form of hardware or software that provide the particular desired functionality. In view of the multiplicity of possible uses and the associated multiplicity of functionalities, there is an increasing tendency to implement a plurality of applications on the same chip card. For each implementation of an application an entry referring to the implementation is provided in a memory of the chip card, so that each implementation is accessible through an associated entry in the memory of the chip card and the corresponding application can be invoked via said entry. This procedure has proved very useful but presupposes that sufficient capacity is available on the chip card to implement a plurality of applications. The chip card must thus be dimensioned considerably larger with regard to its memory size or other hardware features compared to a chip card with only one implemented application, which in turn results in increased production costs of the chip card.

The invention is based on the problem of equipping a chip card with an extended functionality using as little effort as possible.

SUMMARY

The inventive chip card has at least one application for which an implementation and an entry referring to the implementation are present on the chip card. The invention is characterized in that a plurality of entries referring to the same implementation are present on the chip card. In other words, the known one-to-one correspondence between the entries in the chip card memory and the implementations present on the chip card is eliminated. Instead, a plurality of entries are present for the same implementation. This has the advantage that the same implementation is multiply utilizable, thereby making it possible to save memory space or additional hardware for further implementations. This inventive multiple use of the same implementation makes it possible to simulate the presence of a number of applications corresponding to the number of entries with a one-to-one correspondence between the entries and the applications. This means that the entries referring to the same implementation can characterize different virtual applications. Although altogether only one implementation is present for all these entries, so that resources need only be available for this one implementation on the chip card, the chip card behaves outwardly as if a separate application were implemented for each entry. The invention thus allows very efficient use of the chip card's resources.

The entries as a rule contain firmly specified information according to a standard, which can specify for example the issuer of the associated application or the application itself. What is significant for the invention is that the entries can moreover each contain a freely selectable information sequence. The freely selectable information sequences of those entries referring to the same implementation can each have a different content. In this way, similar applications can be represented by a single implementation with very little effort, whereby the differences between the single applications can be taken into account in the freely selectable information sequences of the entries in each case. In particular, the freely selectable information sequences can have specifications for execution of the associated implementations.

In a preferred embodiment, the inventive chip card is intended for use in a handset of a mobile phone system. To supply a plurality of network access authorizations on the chip card, a single implementation can be present for a plurality of virtual applications for proving a network access authorization. In particular, one entry can be present for each virtual application for proving a network access authorization, the entries referring to the same implementation and a different network access authorization being available via each entry. The entries can have different parameters that are evaluated when invoking the virtual applications for proving a network access authorization and effectuate the use of the data belonging to the particular network access authorization. Thus, the use of different data according to the particular desired network access authorization can be guaranteed despite the execution of the same implementation.

The invention relates further to a method for executing an application available on a chip card. The inventive method is characterized in that one of a plurality of entries present on the chip card and referring jointly to an implementation of the application on the chip card is evaluated, and said implementation is executed in a way specified by the evaluated entry. In particular, the implementation present on the chip card is executed in different ways depending on which of the entries referring to the implementation is evaluated.

The invention will be explained more precisely in the following with reference to the embodiment shown in the drawing, which relates to a chip card intended for a handset of a mobile phone system. The invention is not restricted to this special field of application, however, but relates equally to chip cards used otherwise.

BRIEF DESCRIPTION OF THE DRAWINGS

The single FIGURE shows a schematic representation of an embodiment for a chip card 1 formed according to the invention. Only a few functional blocks that are significant for the invention are shown. The other functionalities of the chip card 1 are not shown in the FIGURE and will not be specified in the following.

DETAILED DESCRIPTION OF THE INVENTION

The chip card 1 has a memory 2 in which a file 3 is stored. Further, the memory 2 stores a plurality of implementations 4 of applications each in the form of corresponding software. As an alternative to forming the implementations 4 as software, the implementations 4 can also be realized on the chip card 1 in the form of hardware. The file 3 contains a plurality of application identifiers 5 that each refer to one of the implementations 4. This is shown by arrows 6 extending from the application identifiers 5 to the implementations 4. The application identifiers 5 consist in each case of an identification portion 7 and an extension portion 8. While the identification portion 7 is completely and firmly specified according to a standard, the extension portion 8 contains an optional portion 9 whose content is freely selectable.

The application identifiers 5 serve to make the implementations 4 accessible from outside, for example to permit a terminal to start one of the applications implemented on the chip card 1, i.e. access to the applications implemented on the chip card 1 is effected in each case through the application identifiers 5. In the present embodiment, the terminal is the handset into which the chip card 1 is inserted. The handset can for example start an application by which the chip card 1 furnishes a proof of network access authorization. Such proof can be required before or during a telephone call and serves to grant only authorized persons access to the mobile phone network and to provide the conditions for a functioning accounting of charges. The proof is furnished by means of an authentication for which secret information is supplied with the help of the application.

It is of essential significance for the invention that a plurality of different application identifiers 5 refer to the same implementation 4. This is indicated in the FIGURE by a plurality of arrows 6 starting out from different application identifiers 5 but ending at the same implementation 4. The same implementation 4, which is present only once on the chip card 1, can thus be accessed through different application identifiers 5. Consequently, the same implementation 4 appears several times on the logical level, i.e. one actual implementation 4 has a plurality of applications associated therewith, with a separate application identifier 5 being present for each application. Since the individual applications do not each have a separate implementation 4 but are jointly associated with the same implementation 4 and exist as separate units only on the logical level, they will also be referred to as virtual applications in the following. In the above-described way it is possible to provide only one implementation 4 for similar applications that differ for example only in the data used, and to nevertheless use the chip card 1 outwardly as if all applications were actually implemented singly.

The differences between the applications can be taken into account in the application identifiers 5. The mode of operation of the application identifiers 5 does not only comprise referring to one of the implementations 4 and thereby making the implementation 4 needed for execution of the application accessible. The application identifiers 5 furthermore influence the manner of execution of the implementations 4. This means that the same implementation 4 is executed in different ways and can thus also generate different results depending on which application identifier 5 the execution is started through. The influence of the application identifiers 5 on the execution of the implementations 4 results from the application identifiers 5 each having in the optional portion 9 of the extension portion 8 one or more or parameters that influence the execution of the implementation 4. Since different application identifiers 5 referring to the same implementation 4 as a rule have different parameters, the manner of execution of the implementation 4 will likewise differ for said application identifiers 5. The parameters can be for example information on memory areas that are accessed during execution of the implementation 4. In the present embodiment in which the chip card 1 is inserted into a handset of a mobile phone system, said memory areas can store for example authorization information needed for proving a network access authorization. Different authorization information is stored in different memory areas. The different memory areas can be addressed through different parameters in the application identifiers 5. This means that depending on which application identifier 5 the execution of the implementation 4 is started through, different authorization information is used for proving a network access authorization. Outwardly the chip card 1 thus behaves as if a plurality of applications for proving a network access authorization were implemented, each application having its own authorization information. However, the application for proving a network access authorization is not actually implemented several times, but is present several times only virtually, i.e. a virtual application for proving a network access authorization is present for each authorization information item.

The invention claimed is:

1. A chip card comprising at least one application for which an implementation and an entry referring to the implementation are present on the chip card, and wherein a plurality of entries referring to the same implementation are present on the chip card, wherein the implementation has a plurality of applications associated therewith, with a separate entry being present for each application and in that the implementation is executed in different ways depending on which entry the implementation starts with.

2. The chip card according to claim 1, wherein the entries referring to the same implementation characterize different virtual applications.

3. The chip card according to claim 1, wherein the entries each contain a freely selectable information sequence.

4. The chip card according to claim 3, wherein the freely selectable information sequences of those entries referring to the same implementation each have a different content.

5. The chip card according to claim 3, wherein the freely selectable information sequences have specifications for execution of the associated implementation.

6. The chip card according claim 1, wherein the chip card is intended for use in a handset of a mobile phone system.

7. The chip card according to claim 6, wherein a single implementation is present for a plurality of virtual applications for proving a network access authorization.

8. The chip card according to claim 7, wherein an entry is present for each virtual application for proving a network access authorization, the entries referring to the same implementation and wherein a different network access authorization is made available through each entry.

9. The chip card according to claim 8, wherein the entries have different parameters that are evaluated when invoking the virtual applications for proving a network access authorization and effectuate the use of the data belonging to the particular network access authorization.

10. A method for executing an application available on a chip card, comprising the steps:

evaluating one of a plurality of entries present on the chip card and referring jointly to a same implementation of the application on the chip card, the implementation having a plurality of applications associated therewith with a separate entry present for each application, and executing said implementation in different ways depending on which entry the implementation starts with.

11. The method according to claim 10, wherein the implementation present on the chip card is executed in different ways depending on which of the entries referring to the implementation is evaluated.

* * * * *